US008266832B2

(12) United States Patent
Markee

(10) Patent No.: US 8,266,832 B2
(45) Date of Patent: Sep. 18, 2012

(54) WRAP-AROUND PROTECTIVE LABEL

(75) Inventor: James K. Markee, Jackson, WI (US)

(73) Assignee: Wisconsin Pharmacal Company, LLC, Jackson, WI (US)

( * ) Notice: Subject to any disclaimer, the term of this patent is extended or adjusted under 35 U.S.C. 154(b) by 130 days.

(21) Appl. No.: 12/966,517

(22) Filed: Dec. 13, 2010

(65) Prior Publication Data

US 2012/0144709 A1 Jun. 14, 2012

(51) Int. Cl.
*B32B 37/10* (2006.01)

(52) U.S. Cl. ............... 40/306; 40/633; 40/638; 156/249

(58) Field of Classification Search .................... 428/77, 428/189, 191; 40/316, 309, 310; 156/249
See application file for complete search history.

(56) References Cited

U.S. PATENT DOCUMENTS 4,159,586 A * 7/1979 Blum .............................. 40/638
4,446,183 A * 5/1984 Savagian ...................... 428/42.3
4,579,759 A * 4/1986 Breuers ......................... 428/375
4,763,930 A * 8/1988 Matney ........................... 283/81
5,342,093 A 8/1994 Weernink
5,933,993 A * 8/1999 Riley .............................. 40/633
5,953,170 A 9/1999 Glancy
6,000,160 A * 12/1999 Riley .............................. 40/633
6,073,377 A 6/2000 Mehta
6,086,697 A 7/2000 Key
6,132,831 A * 10/2000 Thomas-Cote ................. 428/43
6,237,269 B1 * 5/2001 Key ................................ 40/638
6,550,171 B1 4/2003 De Werra et al.
6,581,973 B2 * 6/2003 Levine et al. ................... 283/81
6,637,775 B1 10/2003 Bernier et al.
6,649,007 B1 * 11/2003 Key .............................. 156/249
7,087,298 B2 * 8/2006 Key .............................. 428/343
7,172,668 B2 * 2/2007 Key ................................ 156/86
7,374,633 B2 5/2008 Sellars
7,520,077 B2 * 4/2009 Riley .............................. 40/633
2007/0213214 A1 9/2007 Roth et al.
2009/0277061 A1 11/2009 Jain et al.

* cited by examiner

*Primary Examiner* — Tashiana Adams
*Assistant Examiner* — Shin Kim
(74) *Attorney, Agent, or Firm* — Thompson Hine L.L.P.

(57) ABSTRACT

A label system including a label having a first portion which has a protective coating thereon and a second portion on a same side thereof which does not have the protective coating. The label further includes a generally transparent window, wherein the window is configured to overlie the second portion when the label is wrapped around a body.

25 Claims, 5 Drawing Sheets

WRAP-AROUND PROTECTIVE LABEL

The present invention is directed to a label, more particularly, to a label which can be wrapped around a vessel and includes a protective portion to protect certain portions of the label.

BACKGROUND

Various goods, products and devices carry a label with indicia printed thereon to provide information to a user or purchaser, such as an identification of the product, a listing of ingredients, instructions for use, etc. However, in certain cases the indicia printed on the label can be prone to scuffing or being wiped off, which reduces the effectiveness of the indicia.

SUMMARY

Accordingly, in one embodiment the present invention is a wrap-around protective label wherein the label is at least partially wrapped around itself to protect information that would otherwise be prone to scuffing or wiping.

DETAILED DESCRIPTION

Figure 1:
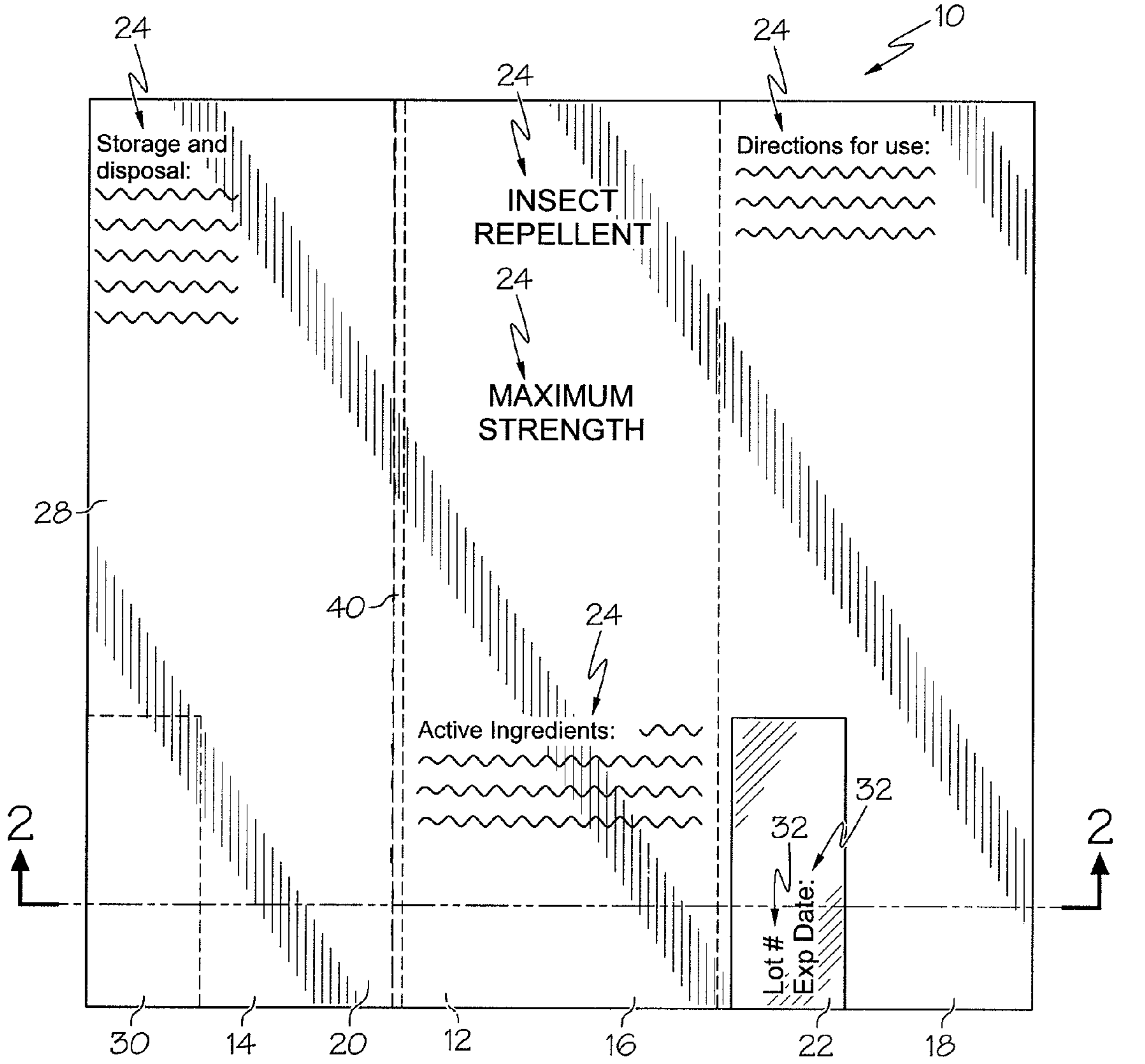
FIG. 1 is a front view of one embodiment of a label of the present invention.
Figure 2:
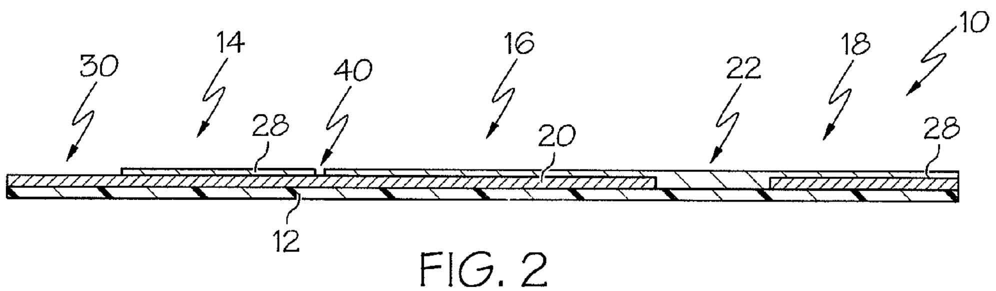
FIG. 2 is a side cross section taken along line 2-2 of FIG. 1.

FIG. 1 shows one embodiment of the label 10 of the present invention laid flat, and before it is utilized with a vessel. The illustrated label 10 is generally flat, planar and rectangular in top view. As shown in FIG. 2, the label 10 may include a substrate 12 which can be made of a variety of materials, such as plastic, polyfilms, polymers or the like, or in some cases even paper or other cellulose-based materials. However, the use of plastic or polymers provides a moisture resistant substrate 12 which may be more tough and durable. In one particular embodiment (as illustrated) the substrate 12 is made of a generally clear or transparent oriented plastic film.

Figure 3:
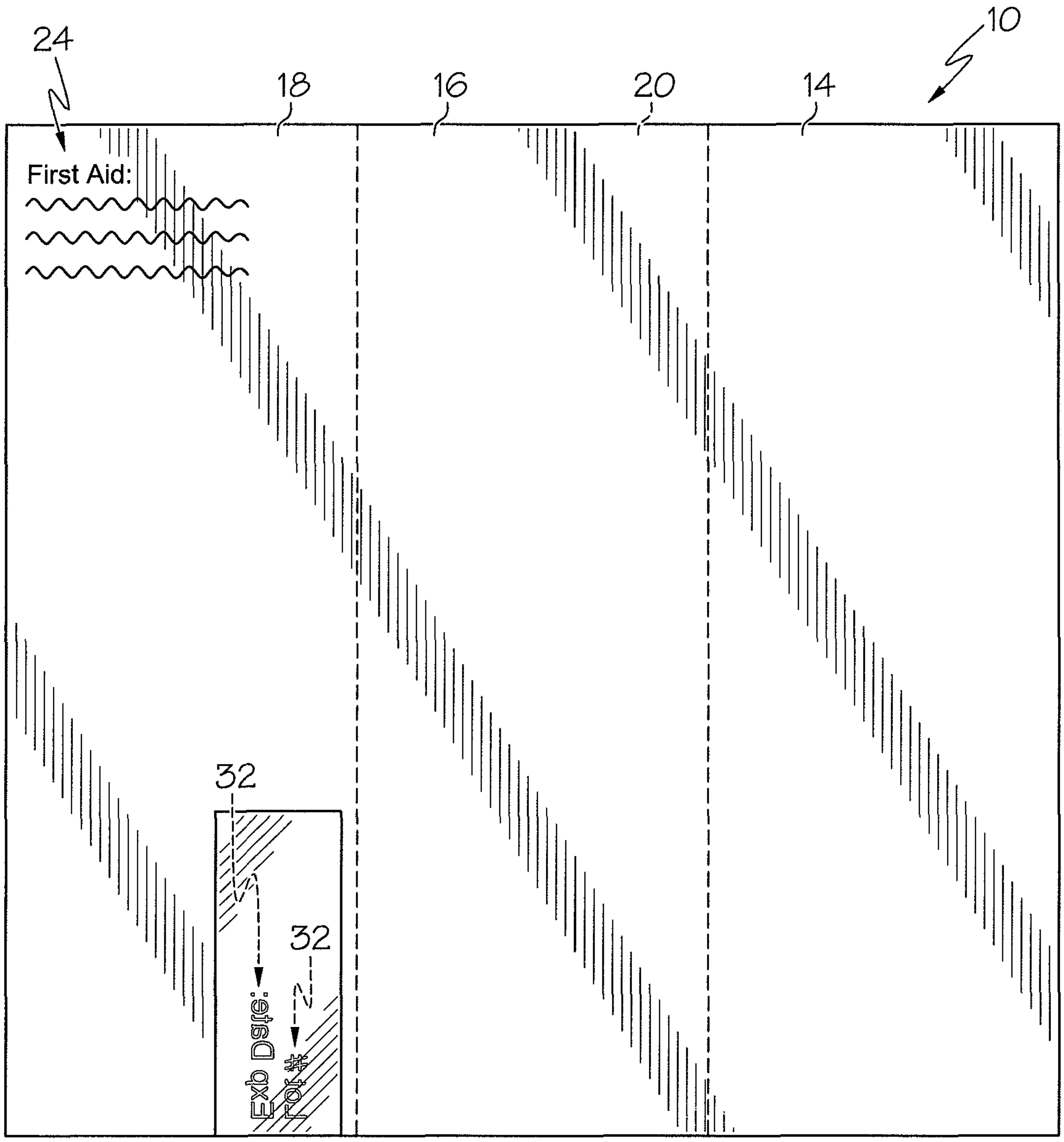
FIG. 3 is a back view of the label of FIG. 1.

As best shown in FIG. 1, the label 10 may be divided into three sections: an underwrap portion 14, a front or center portion 16 and an overwrap portion 18. In the illustrated embodiment the portions 14, 16, 18 each constitute about one-third of the surface area of the label 10, and are separated by the short-dashed vertically extending lines indicated on FIGS. 1 and 3 (it should be understood that the vertically extending dashed lines in FIGS. 1 and 3 are provided for illustrative purpose and are not necessarily present on the actual label 10).

As best shown in FIG. 2, a background layer of ink 20 is coated onto parts of the substrate 12. The background 20 may be particularly useful when the substrate 12 is clear or transparent, but may not be required when the substrate 12 is already colored or pigmented. The background ink 20 can take any of a wide variety of forms, such as aqueous-based inks and pigments, non-aqueous inks and pigments, etc. In the illustrated embodiment the background 20 includes a continuous color (such as white) or other colors that provide a background for various text, indicia and/or graphics printed thereon. In the embodiment shown in FIGS. 1-7 the background 20 covers all of the substrate 12 except for a window portion 22 positioned on the overwrap portion 18. However, the background 20 may be omitted from certain other areas of the substrate 12, particularly if those portions are desired to remain clear or transparent.

Figure 5:
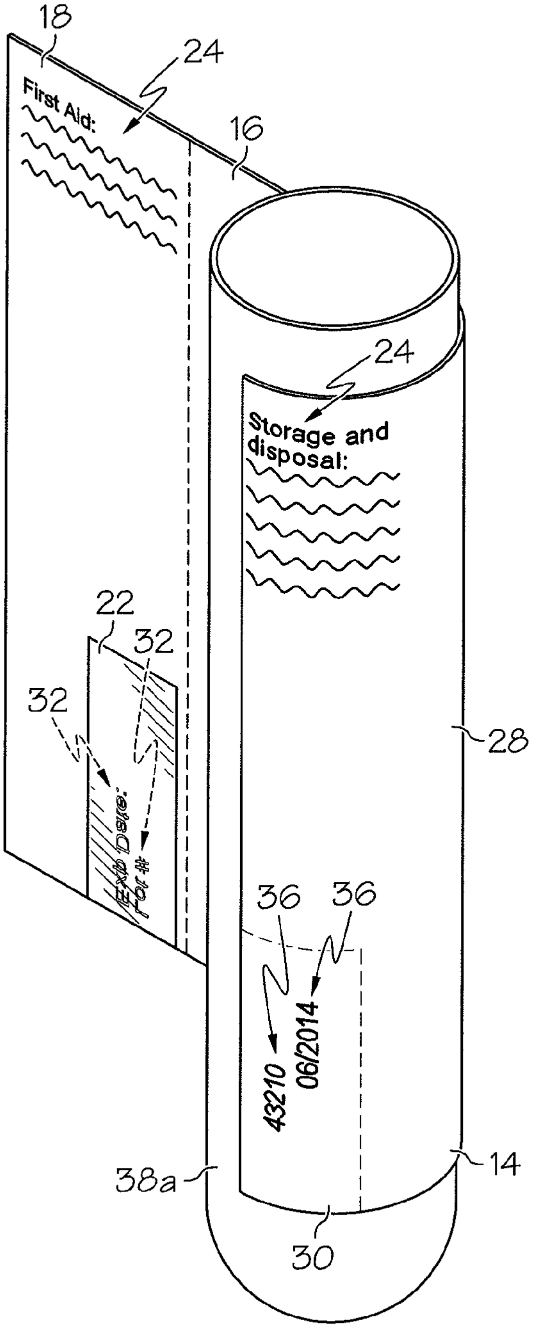
FIG. 5 is a front perspective view of the label of FIG. 4 partially wrapped around the vessel of FIG. 4.
Figure 6:
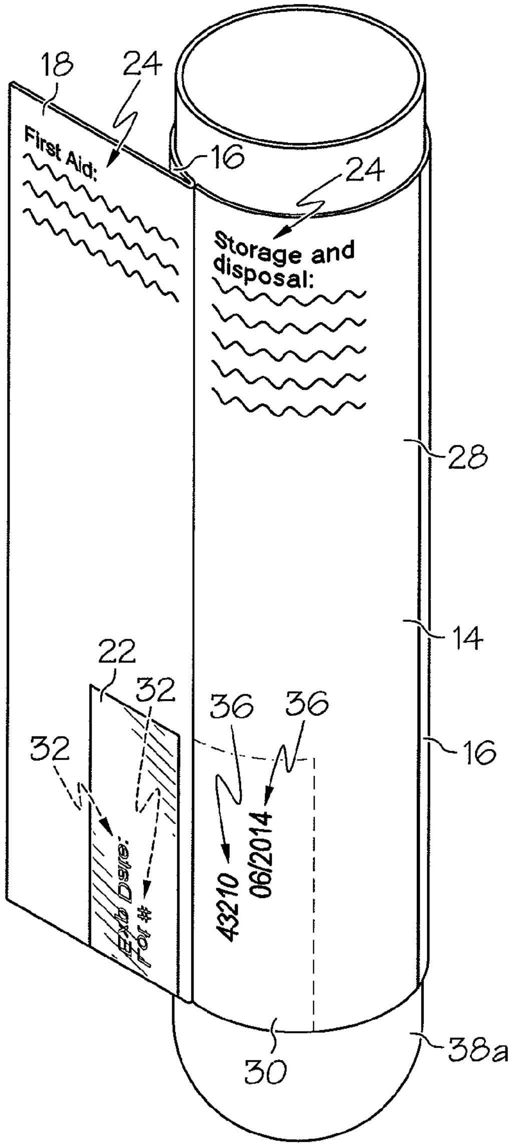
FIG. 6 is a front perspective view of the label of FIG. 5, with the label further partially wrapped around the vessel.

Various indicia 24 may be printed on the substrate 12, either directly on the substrate 12 and/or on the background ink 20. The indicia 24 may relate to the product with which the label 10 will be associated. For example, in the illustrated embodiment the indicia 24 includes information identifying the product, providing promotional text or indicia, listing ingredients, providing directions for use, providing directions for storage and disposal, and providing first aid direction. A wide variety of other indicia 24 can also be provided on the label 10, including but not limited to indicia identifying the manufacturer, providing contact information, providing weight and volume information, providing safety warnings, listing trademarks or other intellectual property markings, etc. Moreover, as shown in FIGS. 3, 5 and 6, in some cases indicia 24 is printed on the back of the overwrap portion 18.

As shown in FIG. 2, a protective coating 28 is positioned on the substrate 12/background 20. The protective coating 28 can be generally clear or transparent and can take the form of a varnish, a plastic or polymer material, a synthetic coating, etc., which is flood coated on the substrate 12 or otherwise applied. In the illustrate embodiment the protective coating 28 covers all or generally all of the substrate 12 except for an uncoated area 30, also termed a printable area or portion 30, leaving the printable portion 30 exposed and more able to accept ink or other printed indicia thereon. The protective coating 28 provides abrasion and/or scuff-resistance to the label 10/substrate 12, and may also provide moisture and solvent resistance in some cases.

If desired, window indicia 32 may be printed on the window 22, either on the underside of the substrate 12, or on the top side of the substrate 12 (i.e. between the substrate 12 and the protective coating 28). In the illustrated embodiment, the window indicia 32 includes the text "Lot #" and "Exp Date:" which refers to the lot number and expiration date of the product. As will be clear from the description below, the window indicia 32 is thus related to indicia which is to be printed on the printable portion 30. However, in some cases the window 22 may not have any indicia pre-printed thereon.

As shown in FIGS. 1 and 3, the label 10 may initially be formed or provided as shown therein, including indicia 24 pre-printed on the label 10 and covered by the protective coating 28, and with no indicia (or at least some blank space) on the printable portion 30. In this manner, a label, as shown in FIGS. 1-3, can be provided or manufactured by a label manufacturer or at a label manufacturing station, and then transported to a labeling plant, filling plant or filling location where the label 10 is matched up with a vessel/product to be labelled.

Figure 4:
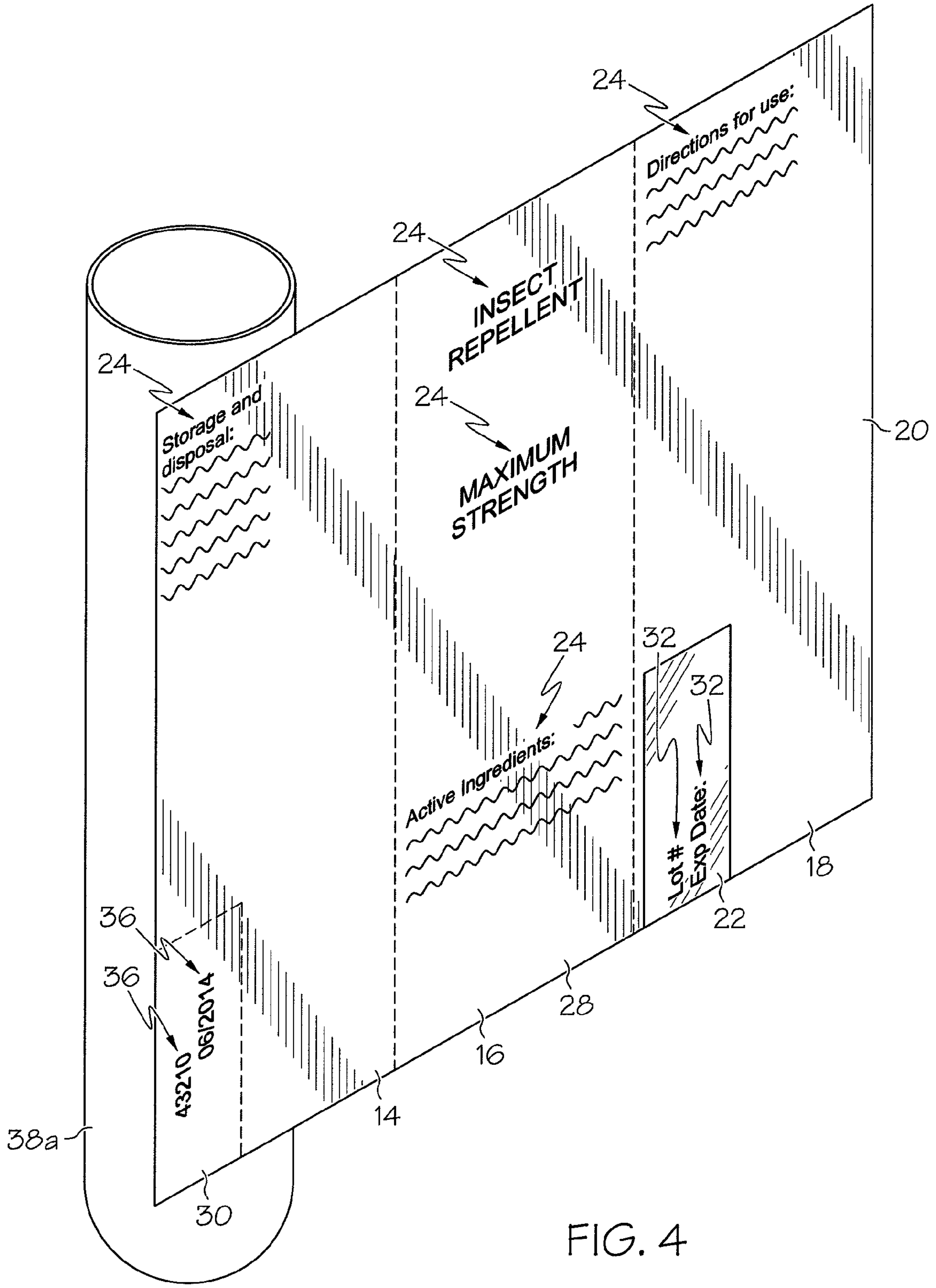
FIG. 4 is a front perspective view of the label of FIG. 1, with indicia printed on the printable portion, and shown in conjunction with a vessel.
Figure 7:
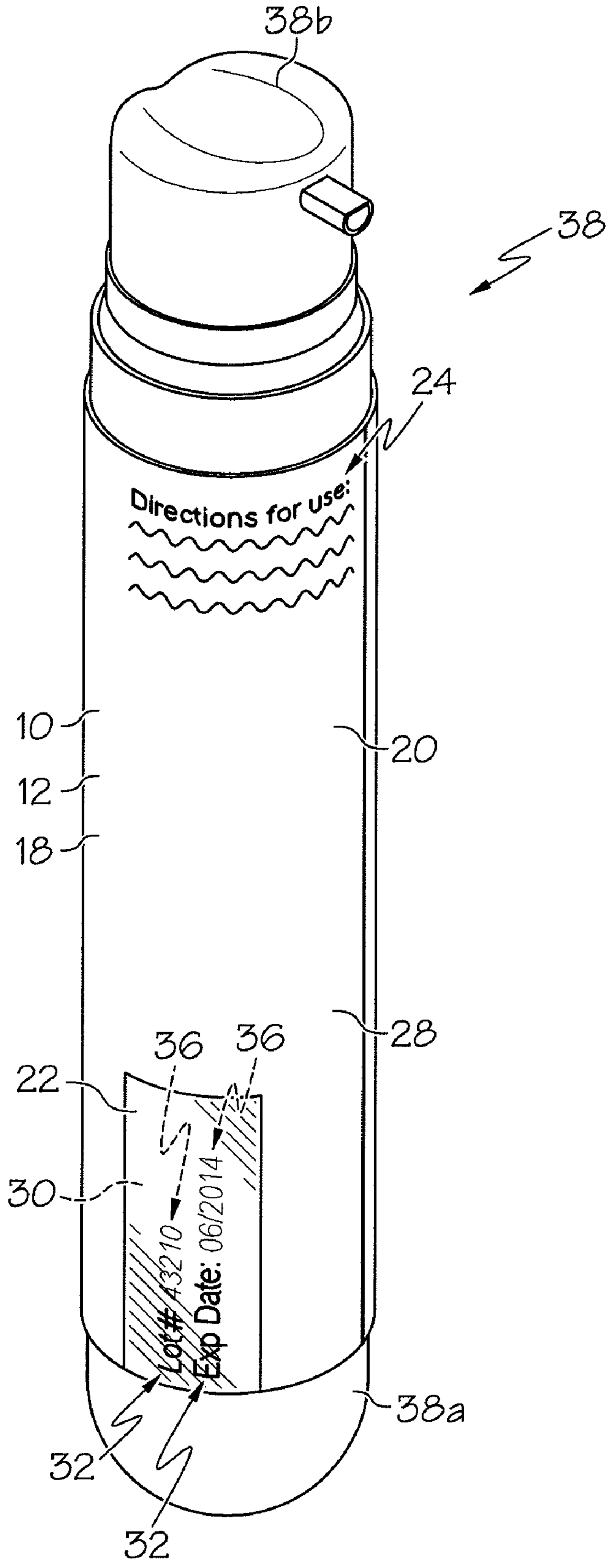
FIG. 7 is a front perspective view of the label of FIG. 6 fully wrapped around the vessel, and with a spray dispenser cap secured thereto.

Once the label 10 is received by the product manufacturer/assembler, the label 10 may need to be customized. In particular, as shown in FIG. 4, particular information, such as job-specific, product-specific or production-run-specific information 36 relating to the associated product may be printed on the printable portion 30. In the illustrative case of an insect repellant, the label 10 may be used in conjunction with a vessel, product or product packaging in the form of a spray dispenser 38 (FIG. 7). Prior to (or even after or during) adding the label 10 to the vessel 38, the particular information 36 relating to the product stored in the vessel 38 is printed on the printable portion 30. For example, in the illustrated embodiment, the lot number ("43210") and expiration date ("June/2014") of the product/insect repellent is printed on the printable portion 30.

The indicia 36 on the printable portion 30 can be printed or deposited by using an ink, pigment, colorants, etc., that are different from the ink, pigment, colorant, etc., utilized to form the indicia 24 on the rest of the label 10. In particular, since the indicia 24 on the rest of the label 10 can be formed in bulk in a sheet-printing process, the indicia 24 on the rest of the label 10 under the protective coating 28 may be more color-rich, detailed and/or indelible that the indicia 36 on the printable portion 30. In one case, the indicia 36 on the printable portion 30 is formed by a hot stamping printing method, in which a matte pigment, carried on a polyester carrier film, is imprinted on the printable portion 30 using heated metal type. However, it is within the scope of the invention to use various other inks, pigments, colorants, etc., on the printable portion 30, including inks, pigments, colorants, etc. that are the same as that used on the rest of the label 10.

After the indicia 36 is printed on the printable portion 30, the label 10 is mated with the vessel 38 by wrapping the label 10 around the cylindrical body 38*a* of the vessel 36. In particular, as shown in FIG. 4, the free edge of the underwrap portion 14 is positioned adjacent to the cylindrical body 38*a*. The label 10 is then partially wrapped around the body 38*a*, as shown in FIGS. 5 and 6. Next, the label 10 is further wrapped around the body 38*a* until the window 22 overlies and/or is aligned with the printable portion 30 and/or the indicia 36 on the printable portion 30, as shown in FIG. 7. Thus, in the illustrated embodiment the indicia 32, 36 cooperate to provide a single coherent message regarding the lot number and expiration date (i.e. "Lot #43210" and "Exp Date: June /2014"). In addition, the window 22/label 10 covers the printable portion 30 to protect the printable portion 30 and the indicia 30 carried thereon. In some cases the window 22 may overlay the printable portion 30 in a sealed manner such that fluid is generally prevented from reaching the printable portion 30.

The label 10 thus wraps around the vessel 38*a* by greater than 360° such that the overwrap portion 18 lies on top of, and overlaps, the underwrap portion 14 to form a two-ply portion. In the illustrated embodiment, the label 10 is divided into equal thirds and the overwrap portion 18, center portion 16 and underwrap portion 14 each extend about 180° around the vessel 38 such that the label 10 has a 180° overlap. However, the overwrap portion 18 can extend more or less than 180°, such as between about 30° and about 270° in one embodiment, to provide appropriate overlap and a secure connection between the overwrap portion 18 and the rest of the label 10.

In filling and/or labeling operations, the label 10 is typically exposed to the filling material (i.e., insect repellant in the illustrative example) as some amounts of the filling material are inevitably spilled or escape during handling. The coating 28 may be resistant to the solvent to protect the indicia 24. However, as noted above, the coating 28 does not cover the printable portion 30. Accordingly, in some previous label systems, information 36 printed on a printable portion 30, such as lot number and expiration date, is prone to being smeared or erased by the filling material, which can act as a solvent to the printable portion indicia 36. However, in the present system, since the printable portion 30 is covered by the window 22, the printable portion indicia 36 is protected from the product/solvent. In addition, window 22 also protects the printable portion indicia 34 from any other solvents, moisture, abrasion or other forces the vessel 38 may encounter during manufacture, use, or storage, or during handling by the user, etc.

An adhesive may be positioned between the vessel 38 and the label 10 to secure the label 10 in place. In particular, the adhesive may be positioned on the inner surface of the label 10 and/or the outer surface of the vessel 38 to secure the label 10 in place. Alternately, or in addition, an adhesive is positioned between the overwrap 18/underwrap portions 14 such that the label 10 is secured to itself to hold the label 10 in place on the vessel 38. However, there may be no adhesive positioned underneath the window 22, or, if an adhesive is used, it should be generally transparent or clear to ensure that the printable portion indicia 36 is clearly visible through the window 22.

In some cases it is desired to allow the overwrap portion 18 to be peeled back and away from the underwrap portion 14 and re-adhered thereto. In this case, the overwrap portion 18 can be peeled back from the underwrap portion 14, as shown in FIG. 6, to expose the indicia 24 on the underwrap portion 14 and the indicia 24 on the underside of the overwrap portion 18. The overwrap portion 18 can then be re-secured on the underwrap portion 14 once the desired indicia 24 is read. The protective coating 28 on the underwrap portion 14 can act as a release coating so that the overlap portion 18 can be peeled back and re-secured in the desired manner. In this case, a single adhesive may be utilized to secure the label 10 to the vessel 38, and to releasably adhere the overwrap portion 18 to the underwrap portion 14. Alternately, a relatively strong, permanent adhesive can be used to secure the underwrap portion 14 and center portion 16 to the vessel 38, and a weaker release adhesive can be utilized to secure the overwrap portion 18 to the underwrap portion 14.

In some cases, a small strip of the underwrap portion 14, adjacent to the center portion 16, may lack the protective coating 28 thereon (i.e. see area 40 in FIGS. 1 and 2). In this case, the adhesive on the overwrap portion 18 may strongly grip the uncoated portion 40 to help retain the overwrap portion 18 in place. However, once a user peels away the associated portion of the overwrap portion 18 (such as by lifting the overwrap portion 18 by a fingernail or the like) the overwrap portion 18 may freely peel away from the rest of the underwrap portion 14.

After the label 10 is securely wrapped around the vessel 38, the vessel 38*a* may be filled with a product to be dispensed. For example, continuing with the illustrative example, the vessel may be filled with an insect repellant, and a cap 38*b* (FIG. 7) is placed on the end of the cylindrical body 38*a* to contain the product therein. Alternately, the vessel 38*a* may be filled and capped prior to the label 10 being placed thereon.

In the case of an insect repellant, the insect repellant may include DEET (N,N-Diethyl-meta-toluamide) or other active or inactive ingredients which can act as a solvent to many inks, including those used to print the printable portion indicia 34. In filling and/or labeling operations, the label 10 may be exposed to the filling material (i.e., insect repellant in the illustrative example) as some amounts of the filling material are inevitably spilled or escape during handling. Accordingly, in the present system, since the printable portion 30 is covered by the window 22 in a sealed manner, the printable portion indicia 36 is protected from the solvent.

Accordingly, the label 10 described herein enables a company which fills the vessels 38 and/or applies the label 10 to receive the labels 10, in the form shown in FIGS. 1 and 3, i.e., with the printable portion 30 blank, or having sufficient space to receive indicia thereon. The particular information 36 desired to be printed on the printable portion 30, such as lot number, expiration date, manufacture date, etc., can be printed on the printable portion 30 as shown in FIG. 4. Thus the label 10 can be partially customized and the customized indicia 36 is protected once the label 10 is affixed in place.

In one embodiment, the printable portion 30 may include an imprint coating carried thereon. The imprint coating can be a material with a matte or other finish, or made of materials which provides a desired (i.e. more absorbent, in one case) surface for receiving the printable portion indicia 36. The imprint coating, if utilized, can be positioned on top of the background ink 20 in the printable portion 30, or utilized in place of the background ink 20 in the printable portion. However, it may not always be necessary to utilize an imprint coating since the window 22 can in many cases provide sufficient protection that the printable portion indicia 36 can be directly printed on glossy or other media traditionally considered to be difficult to print upon.

In the embodiment shown in FIGS. 1-7, window indicia 32, such as "Lot #" and "Exp Date:" is printed thereon. However, the window 22 may not carry any pre-printed indicia, and alternately the printable portion 30 may carry pre-printed indicia. For example, indicia (such as "Lot #" and "Exp Date:") can be pre-printed on the printable portion 30. Further alternately, the associated indicia "Lot #" and "Exp Date:" may not be pre-printed anywhere on the label 10 and can instead be printed at the same time that the specific lot number and expiration date data (i.e., the customized indicia 36) is printed.

In addition, in the embodiment shown in FIGS. 1-7, the printable portion 30 is positioned at a corner of the label 10, and the window 22 is positioned along a common edge of the label 10 but spaced away from its associated corner, to enable the label 10 to overlap itself by the desired amount. However, this configuration can be varied such that the window 22 is positioned at a corner of the label 10 and the printable portion 30 is positioned on a common edge but spaced away from the associated corner, or both the printable portion 30 and window 22 can be spaced away from a corner. However, the configuration shown in FIGS. 1-7 can be advantageous since once the label 10 is assembled the printable portion 30 is spaced away from the free edge of the label 10. Moreover, the printable portion 30/window 22 can be positioned at any location of the label 10, so long as they are aligned such that the window 22 overwraps the printable portion 30, or at least part of the printable portion 30, when the label 10 is wrapped around the vessel 38.

Although the label 10 is shown used in conjunction with a vessel 38 for storing insect repellant, it should be understood that the label 10 can be wrapped around any of a wide variety of items, such as vessels for storing nearly any contents, including solids, gels and fluids. In addition, the label 10 can be configured to be wrapped directly around a product itself, such as, for example, a stick of chalk, a styptic pencil, a crayon, etc. Further, the vessel/item 38 need not necessarily be cylindrical but can have any of a wide variety of shapes in cross-section, such as triangular, square, hexagonal, octagonal, irregular shapes, etc.

The relative size of printable portion 30 can vary. However, in one embodiment the printable portion 30 may take up a relatively small percent of the surface area of the label 10, such as less than about 30%, or less than about 20% in one case to allow the indica 24 to cover the majority of the label 10 and provide an attractive appearance to the product. The portions of the label 10 provided with the protective coating 28 (i.e. the shielded portion) can take up at least about 70% or about 80% of the surface area to maximize the indicia 24 which can be pre-printed and protected by the protective coating 28.

The window 22 may have the surface area about equal to the surface area of the printable portion 30 (i.e., within about 10% of the surface area of the printable portion 30) so that the size of the window 22 and the printable portion 30 generally match. However, the window 22 can be sized larger than the printable portion 30, i.e., to allow for manufacturing tolerances and imperfections during the printing and/or wrapping process. Alternately, the window 22 can be sized smaller than the printable portion 30 to provide a clear border about the printable portion 30.

Although the invention is shown and described with respect to certain embodiments, it should be clear that modifications will occur to those skilled in the art upon reading and understanding the specification, and the present invention includes all such modifications.

What is claimed is:

1. A label system comprising:

a label having a first portion which has a protective coating thereon and a second portion on a same side thereof which does not have said protective coating, said label further including a generally transparent window, wherein said window is configured to overlie said second portion when said label is wrapped around a body.

2. The system of claim 1 wherein said label includes a substrate and wherein said protective coating is positioned on top of said substrate.

3. The system of claim 2 wherein said substrate is generally transparent.

4. The system of claim 3 wherein said first portion includes a background color printed on said substrate, and wherein said window does not include said background color.

5. The system of claim 1 wherein said window is positioned in said first portion of said label.

6. The system of claim 1 wherein said second portion is configured to receive indicia printed thereon.

7. The system of claim 1 wherein first portion constitutes at least about 80% of the surface area of said side of said label.

8. The system of claim 1 wherein said protective coating is a varnish.

9. The system of claim 1 wherein said window has a surface area about equal to the surface area of said second portion.

10. The system of claim 1 wherein at least one of said window or said second portion is positioned at or adjacent to a corner of said label.

11. The system of claim 1 wherein said label is wrapped around a body such that said window overlies said second portion.

12. The system of claim 11 wherein said window overlies said second portion in a generally sealed manner to protect indicia printed thereon.

13. The system of claim 11 wherein said body is a product or is a vessel storing a product therein.

14. The system of claim 13 wherein said second portion includes indicia printed thereon relating to said product.

15. The system of claim 14 wherein said indicia printed on said second portion is at least one of lot information or expiration information relating to said product.

16. The system of claim 14 wherein said product is a solvent to said indicia printed on said second portion.

17. The system of claim 14 wherein said window includes indicia pre-printed thereon, and wherein said window indicia is positioned adjacent to and cooperates with said second portion indicia.

18. The system of claim 14 wherein said first portion includes information printed thereon relating to the identification, qualities, or ingredients of the contents of said product, and wherein said first portion indicia is printed with a differing ink, pigment or colorant than said second portion indicia.

19. The system of claim 11 wherein said label is wrapped around said body such that said at least part of said label overlaps itself to form a two-ply portion, and wherein said two-ply portion extends circumferentially least about 30° about a perimeter of said body.

20. The system of claim 19 wherein said protective coating acts as a release coating for said overlapping portion such that said overlapping portion is releasably secured to an underlying portion of said label.

21. The system of claim 20 wherein said underlying portion includes an area lacking said protective coating and positioned adjacent to a free edge of said overlapping portion such that said free edge of said overlapping portion is relatively strongly secured to said underlying portion.

22. The system of claim 1 wherein said protective coating is generally transparent.

23. A method for preparing a label comprising the steps of:

accessing a label having a first portion which has a protective coating thereon and a second portion on a same side thereof which lacks said protective coating, said first portion having indicia pre-printed thereon, said label further including a generally transparent window, wherein said window is configured to overlie said second portion when said label is wrapped around a body;

and printing indicia on said second portion.

24. The method of claim 23 wherein said printing step includes printing at least one of lot information or expiration information related to a product associated with said label.

25. The method of claim 23 further comprising the step of accessing a body and wrapping said label about said body such that said window overlies said second portion in a generally sealed manner.

* * * * *